United States Patent
Nakamizo et al.

(10) Patent No.: US 12,085,635 B2
(45) Date of Patent: Sep. 10, 2024

(54) SIGNAL PROCESSING DEVICE AND RADAR DEVICE

(71) Applicant: MITSUBISHI ELECTRIC CORPORATION, Tokyo (JP)

(72) Inventors: Hideyuki Nakamizo, Tokyo (JP); Kenichi Tajima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 410 days.

(21) Appl. No.: 17/515,670

(22) Filed: Nov. 1, 2021

(65) Prior Publication Data

US 2022/0050195 A1 Feb. 17, 2022

Related U.S. Application Data

(63) Continuation of application No. PCT/JP2019/022625, filed on Jun. 6, 2019.

(51) Int. Cl.
*G01S 13/58* (2006.01)
*G01S 13/06* (2006.01)

(52) U.S. Cl.
CPC ............ *G01S 13/584* (2013.01); *G01S 13/06* (2013.01)

(58) Field of Classification Search
CPC ................................ G01S 13/584; G01S 13/06
See application file for complete search history.

(56) References Cited

U.S. PATENT DOCUMENTS

| | | | |
|---|---|---|---|
| 2015/0226848 A1* | 8/2015 | Park | G01S 13/584 342/93 |
| 2015/0276929 A1* | 10/2015 | Li | G01S 13/58 342/112 |
| 2017/0023670 A1* | 1/2017 | Jansen | G01S 13/343 |
| 2018/0088224 A1 | 3/2018 | Kishigami | |
| 2018/0106888 A1* | 4/2018 | Heuel | G01S 13/34 |
| 2019/0049555 A1* | 2/2019 | Sreekiran | H01Q 1/3233 |

(Continued)

FOREIGN PATENT DOCUMENTS

| | | |
|---|---|---|
| JP | 5-297120 A | 11/1993 |
| JP | 2002-14159 A | 1/2002 |

(Continued)

OTHER PUBLICATIONS

German Office Action for German Application No. 112019007289.7, dated Mar. 7, 2022, with English translation.

(Continued)

*Primary Examiner* — Marcus E Windrich
(74) *Attorney, Agent, or Firm* — Birch, Stewart, Kolasch & Birch, LLP

(57) ABSTRACT

A signal processing device includes: an amplitude reducing unit to reduce, when a phase shift control signal indicating a phase shift of a transmission wave whose frequency is modulated is output, among amplitudes of a beat signal having a difference frequency between the transmission wave and a reception wave, an amplitude of the beat signal at a timing at which a phase of the transmission wave is shifted in accordance with the phase shift control signal; and a signal converting unit to convert the beat signal whose amplitude at the timing at which the phase of the transmission wave is shifted is reduced by the amplitude reducing unit into a signal in a frequency domain.

11 Claims, 9 Drawing Sheets

(56) References Cited

U.S. PATENT DOCUMENTS

2019/0179012 A1* 6/2019 Heo .................. G01S 17/931
2019/0369221 A1* 12/2019 Umehira ............ G01S 13/34

FOREIGN PATENT DOCUMENTS

JP      2018-54327 A      4/2018
WO    WO2018/183877 A1   9/2018

OTHER PUBLICATIONS

Barjenbruch et al., "A Method for Interference Cancellation in Automotive Radar", IEEE MTT-S International Conference on Microwaves for Intelligent Mobility, 2015, Total 4 pages.
International Search Report (PCT/ISA/210) issued in PCT/JP2019/022625 mailed on Jul. 30, 2019.
Kim, "Identification of FMCW Radar in Mutual Interference Environments Using Frequency Ramp Modulation," EuCAP 2016, Total 3 pages.

* cited by examiner

SIGNAL PROCESSING DEVICE AND RADAR DEVICE

CROSS REFERENCE TO RELATED APPLICATIONS

This application is a Continuation of PCT International Application No. PCT/JP2019/022625, filed on Jun. 6, 2019, which is hereby expressly incorporated by reference into the present application.

TECHNICAL FIELD

The present invention relates to a signal processing device and a radar device for converting a beat signal having a difference frequency between a transmission wave and a reception wave into a signal in a frequency domain.

BACKGROUND ART

As one of radar systems, there is a frequency modulated continuous waves (FMCW) system. A radar device according to the FMCW system emits as a transmission wave a frequency modulation signal whose frequency is modulated, and receives the transmission wave reflected by a measurement object as a reflected wave. The FMCW radar device generates a beat signal having a difference frequency between the emitted transmission wave and the received reflected wave, and detects a distance to the measurement object or a relative speed to the measurement object from a frequency included in the beat signal.

The FMCW radar device can detect a distance to a measurement object and a relative speed to the measurement object with a relatively simple configuration, and therefore is often used as, for example, an in-vehicle millimeter wave radar device.

Radio wave interference may occur between a plurality of the same type of FMCW radar devices. That is, a certain FMCW radar device (hereinafter, referred to as a "first radar device") may receive, in addition to a reflected wave obtained by reflection of a transmission wave emitted by the first radar device by a measurement object, a transmission wave emitted by another FMCW radar device (hereinafter, referred to as a "second radar device") of the same type as the first radar device. In this case, the transmission wave emitted from the second radar device and received by the first radar device is an interference wave that interferes with the reflected wave received by the first radar device. The interference wave may hinder the first radar device detecting the measurement object.

Patent Literature 1 below discloses a radar device that makes it difficult to receive radio wave interference between a plurality of radar devices of the same type.

In the radar device disclosed in Patent Literature 1, a phase modulator generates a transmission wave by subjecting a transmission carrier signal that is a frequency modulation signal to two-phase phase modulation with a phase modulation code based on a random code output from a code generator, and a transmission antenna emits the transmission wave into space. In this radar device, a delay circuit delays the phase modulation code output from the code generator, and a phase demodulator generates a beat signal by subjecting a reception signal output from a reception antenna to two-phase phase demodulation with the delayed phase modulation code.

In the radar device disclosed in Patent Literature 1, even when the amplitude of the reflected wave received by the reception antenna is the same as the amplitude of the interference wave, the amplitude of the beat signal related to the reflected wave is relatively larger than the amplitude of the beat signal related to the interference wave. Since the amplitude of the beat signal related to the reflected wave is relatively larger than the amplitude of the beat signal related to the interference wave, it is easy to discriminate the beat signal related to the reflected wave from the beat signal related to the interference wave.

CITATION LIST

Patent Literature

Patent Literature 1: JP 2002-014159 A

SUMMARY OF INVENTION

Technical Problem

In the radar device disclosed in Patent Literature 1, the phase modulator subjects a transmission carrier signal to two-phase phase modulation while modulating the frequency of the transmission carrier signal, and the phase of the transmission carrier signal is shifted while the frequency is modulated. Since time required for the reflected wave to return to the reception antenna after the transmission wave is emitted from the transmission antenna is extremely short, the phase shift timing of the transmission wave is substantially the same as the phase shift timing of the reflected wave. Therefore, the phase of the beat signal having a difference frequency between the transmission wave and the reflected wave is substantially continuous.

Meanwhile, since the interference wave is not subjected to two-phase phase modulation by a phase shift modulation code based on the same random code as that of the transmission wave, the phase of the beat signal having a difference frequency between the transmission wave and the interference wave is discontinuous.

Here, the frequency of the beat signal can be determined, for example, by multiplying the beat signal by a window function and subjecting the beat signal after the window function multiplication to fast Fourier transform (FFT).

However, when the beat signal having a difference frequency between the transmission wave and the interference wave is multiplied by the window function, and the beat signal after the window function multiplication is subjected to FFT, the amplitude at a discontinuous point of a phase increases, and therefore a noise included in the beat signal increases.

Therefore, when the phase modulator subjects the transmission carrier signal to two-phase phase modulation while modulating the frequency of the transmission carrier signal, a noise included in the beat signal having a difference frequency between the transmission wave and the interference wave may increase.

In a case where the noise included in the beat signal having a difference frequency between the transmission wave and the interference wave increases, when the signal intensity of a reflected wave component from the measurement object included in the beat signal having a difference frequency between the transmission wave and the reflected wave is small, the reflected wave component from the measurement object may be buried in the noise included in the beat signal having a difference frequency between the transmission wave and the interference wave. When the reflected wave component from the measurement object is buried in the noise included in the beat signal having a difference frequency between the transmission wave and the interference wave, there is a problem that the measurement object cannot be detected.

The present invention has been made in order to solve the above-described problem, and an object of the present invention is to obtain a signal processing device and a radar device capable of reducing a noise included in a beat signal having a difference frequency between a transmission wave and an interference wave included in a reception wave.

Solution to Problem

A signal processing device according to the present invention includes: processing circuitry to reduce, when a phase shift control signal indicating phase shift of a transmission wave whose frequency is modulated is output at a timing at which phase of the transmission wave is shifted discontinuously during changing frequency of the transmission wave, among amplitudes of a beat signal having a difference frequency between the transmission wave and a reception wave, an amplitude of the beat signal at a timing at which a phase of the transmission wave is shifted in accordance with the phase shift control signal; and to convert the beat signal whose amplitude at the timing is reduced into a signal in a frequency domain.

Advantageous Effects of Invention

According to the present invention, the signal processing device is configured in such a manner that the amplitude reducing unit reduces, when a phase shift control signal indicating phase shift of a transmission wave whose frequency is modulated is output, an amplitude of a beat signal having a difference frequency between the transmission wave and a reception wave at a timing when the phase of the transmission wave is shifted in accordance with the phase shift control signal. Therefore, the signal processing device according to the present invention can reduce a noise included in the beat signal having a difference frequency between the transmission wave and the interference wave included in the reception wave.

BRIEF DESCRIPTION OF DRAWINGS

FIG. 3 is a hardware configuration diagram of a computer when the signal processing device 2 is implemented by software, firmware, or the like.

DESCRIPTION OF EMBODIMENTS

Hereinafter, in order to describe the present invention in more detail, embodiments for performing the present invention will be described with reference to the attached drawings.

First Embodiment

Figure 1:
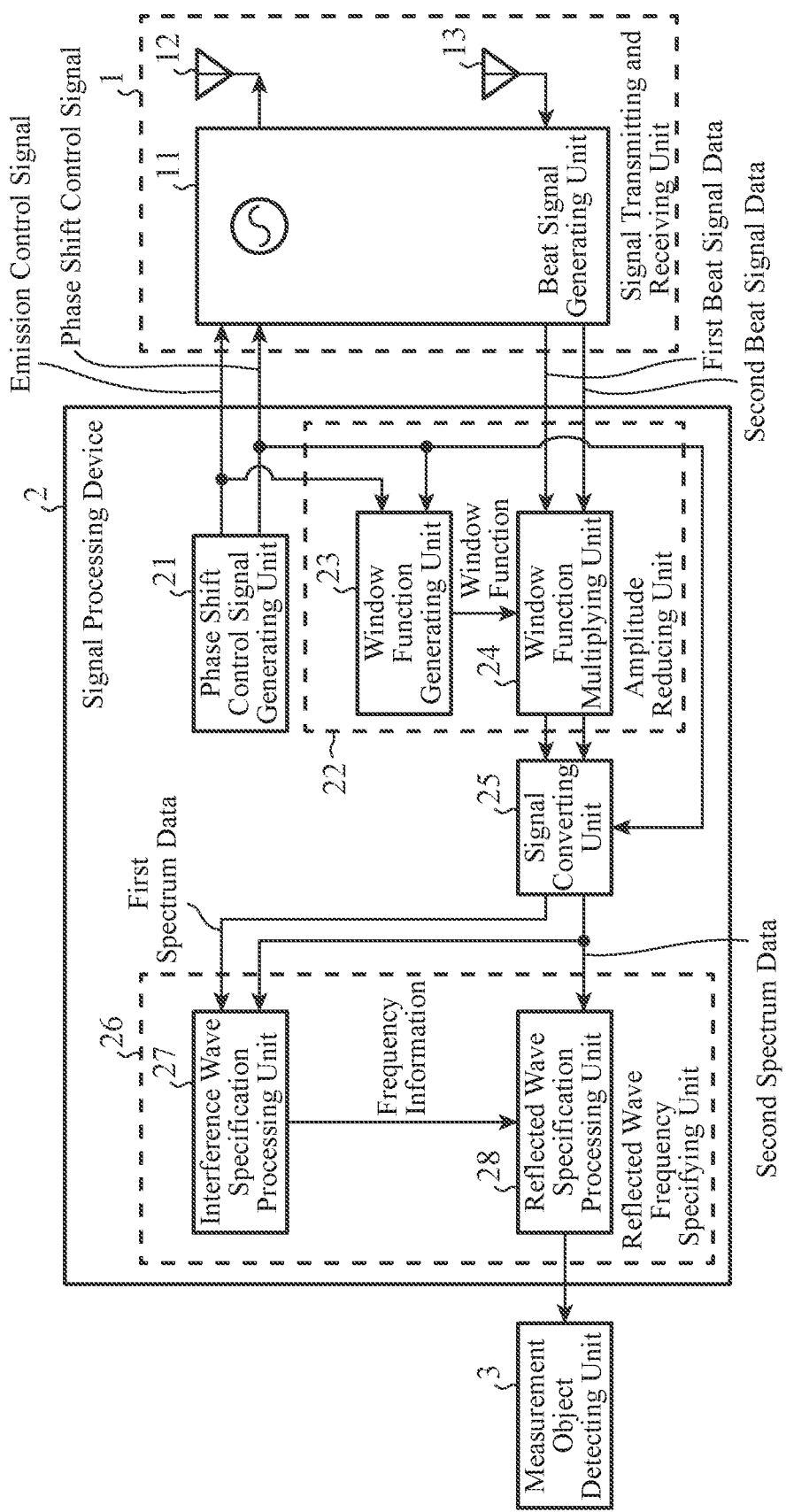
FIG. 1 is a configuration diagram illustrating a radar device according to a first embodiment.

FIG. 1 is a configuration diagram illustrating a radar device according to a first embodiment.

Figure 2:
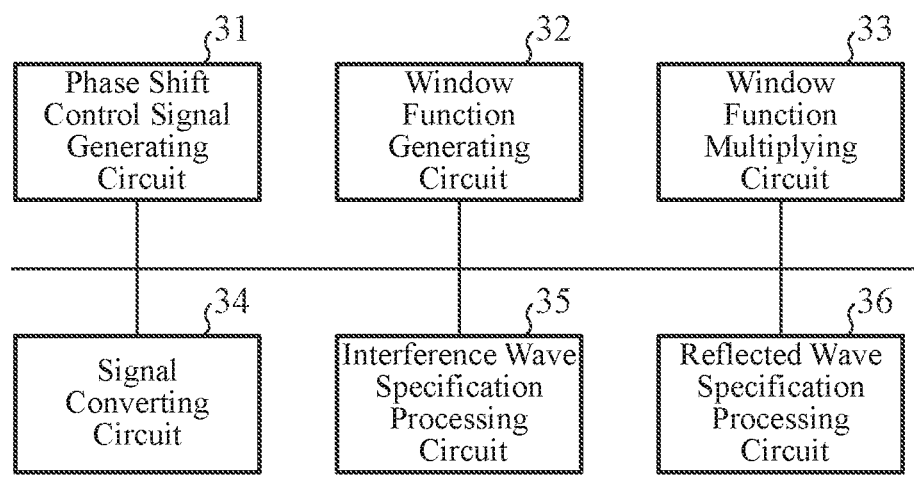
FIG. 2 is a hardware configuration diagram illustrating hardware of a signal processing device 2 included in the radar device according to the first embodiment.

FIG. 2 is a hardware configuration diagram illustrating hardware of a signal processing device 2 included in the radar device according to the first embodiment.

As illustrated in FIG. 1, the radar device according to the first embodiment includes a signal transmitting and receiving unit 1, the signal processing device 2, and a measurement object detecting unit 3.

The signal transmitting and receiving unit 1 includes a beat signal generating unit 11, a transmission antenna 12, and a reception antenna 13.

The radar device according to the first embodiment is an FMCW radar device. The radar device according to the first embodiment can selectively perform either a transmission process of shifting the phase of a transmission wave while modulating the frequency of the transmission wave or a transmission process of not shifting the phase of the transmission wave while modulating the frequency of the transmission wave.

Hereinafter, a period during which the radar device according to the first embodiment performs a transmission process of shifting the phase of a transmission wave while modulating the frequency of the transmission wave is defined as a first transmission process period, and a period during which the radar device according to the first embodiment performs a transmission process of not shifting the phase of the transmission wave while modulating the frequency of the transmission wave is defined as a second transmission process period.

Therefore, during the first transmission process period, a phase shift control signal is output from a phase shift control signal generating unit 21 described later to the signal transmitting and receiving unit 1 described later.

Meanwhile, during the second transmission process period, a phase shift control signal is not output from the phase shift control signal generating unit 21 to the signal transmitting and receiving unit 1.

When an emission control signal is output from the phase shift control signal generating unit 21 at the start of the first transmission process period, the signal transmitting and receiving unit 1 starts to generate a transmission wave whose frequency changes with a lapse of time.

The signal transmitting and receiving unit 1 starts to emit the generated transmission wave from the transmission antenna 12 and receive a reflected wave from a measurement object as a reception wave by the reception antenna 13.

The signal transmitting and receiving unit 1 shifts the phase of the generated transmission wave in accordance with the phase shift control signal output from the phase shift control signal generating unit 21 during the first transmission process period. Phase shift of a frequency modulation signal that is a transmission wave will be described later.

After emitting the transmission wave after the phase shift, the signal transmitting and receiving unit 1 receives a reflected wave from the measurement object as a reception wave.

The signal transmitting and receiving unit 1 generates a first beat signal that is a beat signal having a difference frequency between the emitted transmission wave and the received reception wave.

The signal transmitting and receiving unit 1 converts the generated first beat signal from an analog signal to a digital signal (hereinafter, referred to as a "first digital signal"), and outputs the first digital signal as first beat signal data to a window function multiplying unit 24 of an amplitude reducing unit 22 described later.

When an emission control signal is output from the phase shift control signal generating unit 21 at the start of the second transmission process period, the signal transmitting and receiving unit 1 starts to generate a transmission wave whose frequency changes with a lapse of time.

After emitting the generated transmission wave, the signal transmitting and receiving unit 1 receives a reflected wave from the measurement object as a reception wave.

The signal transmitting and receiving unit 1 generates a second beat signal that is a beat signal having a difference frequency between the emitted transmission wave and the received reception wave.

The signal transmitting and receiving unit 1 converts the generated second beat signal from an analog signal to a digital signal (hereinafter, referred to as a "second digital signal"), and outputs the second digital signal as second beat signal data to the window function multiplying unit 24 of the amplitude reducing unit 22.

The beat signal generating unit 11 is implemented by a phased lock loop, a phase shifter, a frequency converter, an analog-to-digital converter, or the like implemented by a silicon integrated circuit (IC) or the like.

When an emission control signal is output from the phase shift control signal generating unit 21 at the start of the first transmission process period, the beat signal generating unit 11 generates a frequency modulation signal whose frequency changes with a lapse of time, and outputs the frequency modulation signal to the transmission antenna 12.

When a phase shift control signal is output from the phase shift control signal generating unit 21 during the first transmission process period, the beat signal generating unit 11 shifts the phase of the generated frequency modulation signal in accordance with the phase shift control signal, and outputs the frequency modulation signal after the phase shift to the transmission antenna 12.

The technique itself for shifting the phase of the frequency modulation signal is a known technique also disclosed in Patent Literature 1. In the radar device illustrated in FIG. 1, a phase shifter included in the beat signal generating unit 11 changes the phase of the generated frequency modulation signal when an emission control signal is output from the phase shift control signal generating unit 21. The phase shift amount of the frequency modulation signal is desirably about 180 degrees in order to facilitate discrimination between a reflected wave from the measurement object and an interference wave. However, when the phase shift amount is larger than 0, discrimination between the reflected wave and the interference wave is easier than a case where the phase shift does not occur at all.

Note that the phase shift amount of the frequency modulation signal may be stored, for example, in an internal memory of the beat signal generating unit 11 or may be given from the outside of the radar device illustrated in FIG. 1.

When an emission control signal is output from the phase shift control signal generating unit 21 at the start of the second transmission process period, the beat signal generating unit 11 generates a frequency modulation signal, and outputs the frequency modulation signal to the transmission antenna 12.

The transmission antenna 12 emits the frequency modulation signal output from the beat signal generating unit 11 into space as a transmission wave.

After the transmission wave is emitted from the transmission antenna 12 into space, the reception antenna 13 receives a reflected wave from the measurement object as a reception wave.

During the first transmission process period, the beat signal generating unit 11 generates a first beat signal having a difference frequency between the emitted transmission wave and the reception wave, and converts the first beat signal from an analog signal to a first digital signal.

The beat signal generating unit 11 outputs the first digital signal as first beat signal data to the window function multiplying unit 24 of the amplitude reducing unit 22.

During the second transmission process period, the beat signal generating unit 11 generates a second beat signal having a difference frequency between the emitted transmission wave and the reception wave, and converts the second beat signal from an analog signal to a second digital signal.

The beat signal generating unit 11 outputs the second digital signal as second beat signal data to the window function multiplying unit 24 of the amplitude reducing unit 22.

The signal processing device 2 includes the phase shift control signal generating unit 21, the amplitude reducing unit 22, a signal converting unit 25, and a reflected wave frequency specifying unit 26.

The signal processing device 2 outputs each of an emission control signal indicating emission of a transmission wave and a phase shift control signal indicating phase shift of the transmission wave to the signal transmitting and receiving unit 1.

The signal processing device 2 compares the first beat signal data output from the signal transmitting and receiving unit 1 with the second beat signal data output from the signal transmitting and receiving unit 1.

The signal processing device 2 specifies the frequency of a reflected wave out of the reflected wave and the interference wave included in the reception wave on the basis of the comparison result between the first beat signal data and the second beat signal data.

The phase shift control signal generating unit 21 is implemented by, for example, a phase shift control signal generating circuit 31 illustrated in FIG. 2.

The phase shift control signal generating unit 21 outputs an emission control signal indicating emission of a transmission wave to each of a window function generating unit 23 described later of the amplitude reducing unit 22 and the beat signal generating unit 11.

The phase shift control signal generating unit 21 outputs a phase shift control signal indicating phase shift of a transmission wave to each of the window function generating unit 23 of the amplitude reducing unit 22, the signal converting unit 25, and the beat signal generating unit 11.

The amplitude reducing unit 22 includes the window function generating unit 23 and the window function multiplying unit 24.

When a phase shift control signal is output from the phase shift control signal generating unit 21, the amplitude reducing unit 22 reduces, among amplitudes of the first beat signal data output from the signal transmitting and receiving unit 1, an amplitude of the first beat signal data at a timing at which the phase of the transmission wave is shifted in accordance with the phase shift control signal.

The amplitude reducing unit 22 outputs the beat signal whose amplitude has been reduced at the timing when the phase of the transmission wave is shifted to the signal converting unit 25.

The window function generating unit 23 is implemented by, for example, a window function generating circuit 32 illustrated in FIG. 2.

When an emission control signal is output from the phase shift control signal generating unit 21, the window function generating unit 23 starts to generate a window function.

When a phase shift control signal is output from the phase shift control signal generating unit 21, the window function generating unit 23 generates a window function for reducing, among amplitudes of the first beat signal data output from the beat signal generating unit 11, an amplitude of the first beat signal data at a timing at which the phase of the transmission wave is shifted in accordance with the phase shift control signal.

The window function generating unit 23 outputs the generated window function to the window function multiplying unit 24.

The window function multiplying unit 24 is implemented by, for example, a window function multiplying circuit 33 illustrated in FIG. 2.

During the first transmission process period, the window function multiplying unit 24 multiplies the first beat signal data output from the beat signal generating unit 11 by the window function generated by the window function generating unit 23.

The window function multiplying unit 24 outputs the first beat signal data after the window function multiplication to the signal converting unit 25.

During the second transmission process period, the window function multiplying unit 24 multiplies the second beat signal data output from the beat signal generating unit 11 by the window function generated by the window function generating unit 23.

The window function multiplying unit 24 outputs the second beat signal data after the window function multiplication to the signal converting unit 25.

The signal converting unit 25 is implemented by, for example, a signal converting circuit 34 illustrated in FIG. 2.

During the first transmission process period, the signal converting unit 25 converts the first beat signal data after the window function multiplication by the window function multiplying unit 24 into a signal in a frequency domain as first spectrum data.

The signal converting unit 25 outputs the first spectrum data to an interference wave specification processing unit 27 described later of the reflected wave frequency specifying unit 26.

During the second transmission process period, the signal converting unit 25 converts the second beat signal data after the window function multiplication by the window function multiplying unit 24 into a signal in a frequency domain as second spectrum data.

The signal converting unit 25 outputs the second spectrum data to each of the interference wave specification processing unit 27 of the reflected wave frequency specifying unit 26 and a reflected wave specification processing unit 28 described later of the reflected wave frequency specifying unit 26.

The reflected wave frequency specifying unit 26 includes the interference wave specification processing unit 27 and the reflected wave specification processing unit 28.

The reflected wave frequency specifying unit 26 acquires each of the first spectrum data and the second spectrum data output from the signal converting unit 25.

The reflected wave frequency specifying unit 26 compares the first spectrum data with the second spectrum data, and specifies the frequency of the reflected wave on the basis of the comparison result between the first spectrum data and the second spectrum data.

The interference wave specification processing unit 27 is implemented by, for example, an interference wave specification processing circuit 35 illustrated in FIG. 2.

The interference wave specification processing unit 27 specifies a peak that does not coincide with any peak included in the first spectrum data among one or more peaks included in the second spectrum data.

The interference wave specification processing unit 27 outputs frequency information indicating the frequency of the specified peak to the reflected wave specification processing unit 28.

The reflected wave specification processing unit 28 is implemented by, for example, a reflected wave specification processing circuit 36 illustrated in FIG. 2.

The reflected wave specification processing unit 28 specifies a frequency other than the frequency indicated by the frequency information output from the interference wave specification processing unit 27 among the frequencies of one or more peaks included in the second spectrum data as the frequency of the reflected wave.

The reflected wave specification processing unit 28 outputs the specified frequency of the reflected wave to the measurement object detecting unit 3.

The measurement object detecting unit 3 calculates either one or both of a distance to the measurement object and a relative speed to the measurement object from the frequency of the reflected wave specified by the reflected wave specification processing unit 28 of the signal processing device 2.

In FIG. 1, it is assumed that each of the phase shift control signal generating unit 21, the window function generating unit 23, the window function multiplying unit 24, the signal converting unit 25, the interference wave specification processing unit 27, and the reflected wave specification processing unit 28, which are constituent elements of the signal processing device 2, is implemented by dedicated hardware as illustrated in FIG. 2. That is, it is assumed that the signal processing device 2 is implemented by the phase shift control signal generating circuit 31, the window function generating circuit 32, the window function multiplying circuit 33, the signal converting circuit 34, the interference wave specification processing circuit 35, and the reflected wave specification processing circuit 36.

Here, each of the phase shift control signal generating circuit 31, the window function generating circuit 32, the window function multiplying circuit 33, the signal converting circuit 34, the interference wave specification processing circuit 35, and the reflected wave specification processing circuit 36 corresponds to, for example, a single circuit, a composite circuit, a programmed processor, a parallel-programmed processor, an application specific integrated circuit (ASIC), a field-programmable gate array (FPGA), or a combination thereof.

The constituent elements of the signal processing device 2 are not limited to those implemented by dedicated hardware, and the signal processing device 2 may be implemented by software, firmware, or a combination of software and firmware.

The software or the firmware is stored as a program in a memory of a computer. The computer means hardware for executing a program. For example, to the computer, a central processing unit (CPU), a central processing device, a processing device, an arithmetic device, a microprocessor, a microcomputer, a processor, or a digital signal processor (DSP) is applicable.

Figure 3:
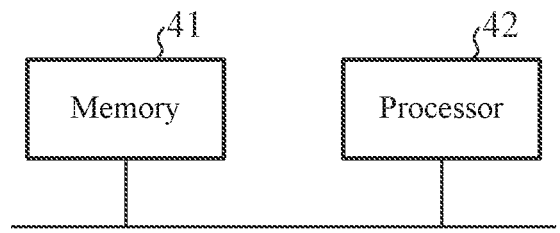

FIG. 3 is a hardware configuration diagram of a computer when the signal processing device 2 is implemented by software, firmware, or the like.

When the signal processing device 2 is implemented by software, firmware, or the like, a program for causing a computer to execute processing procedures performed by the phase shift control signal generating unit 21, the window function generating unit 23, the window function multiplying unit 24, the signal converting unit 25, the interference wave specification processing unit 27, and the reflected wave specification processing unit 28 is stored in a memory 41. A processor 42 of the computer executes the program stored in the memory 41.

FIG. 2 illustrates an example in which each of the constituent elements of the signal processing device 2 is implemented by dedicated hardware, and FIG. 3 illustrates an example in which the signal processing device 2 is implemented by software, firmware, or the like. However, this is only an example, and some constituent elements in the signal processing device 2 may be implemented by dedicated hardware, and the remaining constituent elements may be implemented by software, firmware, or the like.

Next, operations of the radar device illustrated in FIG. 1 will be described.

Figure 4:
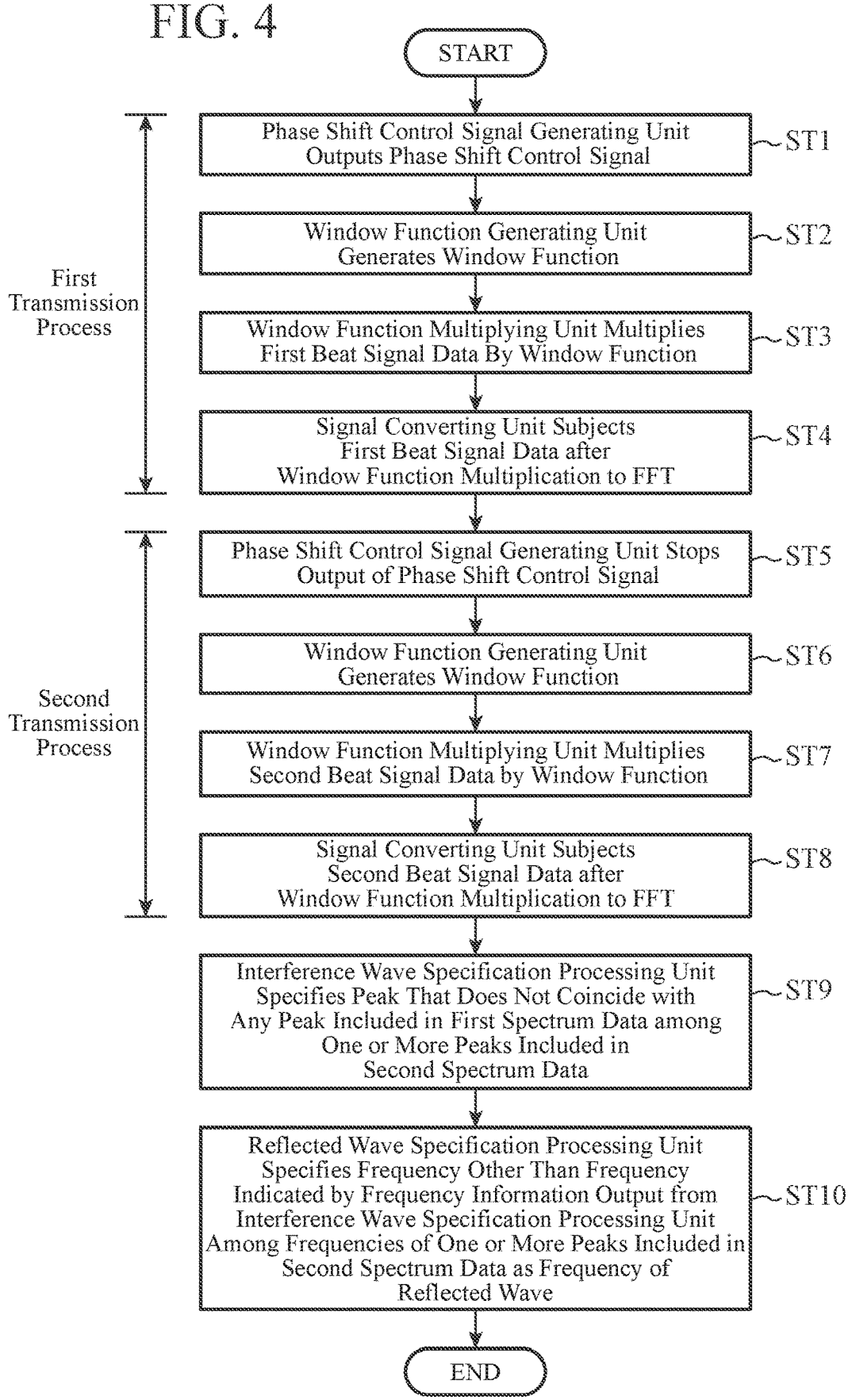
FIG. 4 is a flowchart illustrating a processing procedure performed by the signal processing device 2.

FIG. 4 is a flowchart illustrating a processing procedure performed by the signal processing device 2.

First, operations of the radar device during the first transmission process period will be described.

First of all, the phase shift control signal generating unit 21 outputs an emission control signal indicating emission of a transmission wave to each of the window function generating unit 23 and the beat signal generating unit 11.

When the emission control signal is output from the phase shift control signal generating unit 21, the beat signal generating unit 11 generates a frequency modulation signal whose frequency changes with a lapse of time, and outputs the frequency modulation signal to the transmission antenna 12.

When a certain period of time elapses after the phase shift control signal generating unit 21 outputs the emission control signal, the phase shift control signal generating unit 21 outputs a phase shift control signal indicating phase shift of a transmission wave to each of the window function generating unit 23, the signal converting unit 25, and the beat signal generating unit 11 (step ST1 in FIG. 4).

The certain period of time may be, for example, stored in an internal memory of the phase shift control signal generating unit 21 or given from the outside of the signal processing device 2.

The certain period of time may be any period of time as long as the phase shift control signal is output between the start time and the end time of the first transmission process period.

When a phase shift control signal is output from the phase shift control signal generating unit 21 during the first transmission process period, the beat signal generating unit 11 shifts the phase of the generated frequency modulation signal in accordance with the phase shift control signal, and outputs the frequency modulation signal after the phase shift to the transmission antenna 12.

The transmission antenna 12 emits the frequency modulation signal output from the beat signal generating unit 11 into space as a transmission wave.

The transmission wave emitted into space is reflected by the measurement object, and the transmission wave reflected by the measurement object is received by the reception antenna 13 as a reflected wave.

In the radar device illustrated in FIG. 1, it is assumed that a transmission wave whose frequency is modulated is emitted from a radar device different from the radar device illustrated in FIG. 1. However, the phase of the transmission wave emitted from a radar device different from the radar device illustrated in FIG. 1 is not shifted while the frequency is modulated.

The transmission wave emitted from a radar device different from the radar device illustrated in FIG. 1 is received by the reception antenna 13 as an interference wave.

Therefore, the reception antenna 13 receives each of the reflected wave from the measurement object and the interference wave as a reception wave.

The beat signal generating unit 11 generates a first beat signal having a difference frequency between the transmission wave emitted from the transmission antenna 12 and the reception wave received by the reception antenna 13.

During the first transmission process period, the beat signal generating unit 11 shifts the phase of the frequency modulation signal at a timing when the phase shift control signal is output from the phase shift control signal generating unit 21. Since transmitting and receiving time required for the reflected wave reflected by the measurement object to return to the reception antenna 13 after the transmission wave is emitted from the transmission antenna 12 is extremely short, the phase shift timing of the transmission wave is substantially the same as the phase shift timing of the reflected wave. The phase shift timing of the transmission wave and the phase shift timing of the reflected wave will be described later. Therefore, the phase of the first beat signal having a difference frequency between the transmission wave and the reflected wave is substantially continuous.

Meanwhile, even if the frequency of the interference wave is modulated by a radar device different from the radar device illustrated in FIG. 1, the phase of the interference wave is not shifted while the frequency is modulated. Therefore, the phase of the beat signal having a difference frequency between the transmission wave and the interference wave is discontinuous.

The beat signal generating unit 11 converts the generated first beat signal from an analog signal to a first digital signal.

The beat signal generating unit 11 outputs the first digital signal as first beat signal data to the window function multiplying unit 24.

When an emission control signal is output from the phase shift control signal generating unit 21, the window function generating unit 23 starts to generate a window function.

When the phase shift control signal is output from the phase shift control signal generating unit 21, the window function generating unit 23 generates a window function for reducing, among amplitudes of the first beat signal data output from the beat signal generating unit 11, an amplitude of the first beat signal data at the timing at which the phase of the transmission wave is shifted in accordance with the phase shift control signal (step ST2 in FIG. 4).

Hereinafter, a window function generating process by the window function generating unit 23 will be specifically described.

In the radar device illustrated in FIG. 1, for example, an internal memory of the window function generating unit 23 stores each of a processing time $t_1$ required for phase shift of the frequency modulation signal in the beat signal generating unit 11, a processing time $t_2$ from acquisition of the reception wave by the beat signal generating unit 11 to generation of the first beat signal data, and a time $t_3$ of the first transmission process period.

The window function generating unit 23 calculates a time $t_{start}$ of a start point of the window function from the processing times $t_1$ and $t_2$ stored in the internal memory and a time to at which the emission control signal is output from the phase shift control signal generating unit 21 as illustrated in the following formula (1).

$$t_{start} = t_0 + t_1 + t_2 \quad (1)$$

The window function generating unit 23 calculates a time $t_{phase}$ at which the phase of the transmission wave is shifted in accordance with the phase shift control signal from the processing times $t_1$ and $t_2$ stored in the internal memory and a time $t_4$ at which the phase shift control signal is output as illustrated in the following formula (2). Since transmitting and receiving time required for the reflected wave reflected by the measurement object to return to the reception antenna 13 after the transmission wave is emitted from the transmission antenna 12 is extremely short, the $t_{phase}$ at which the phase of the transmission wave is shifted corresponds to each of the phase shift timing of the transmission wave and the phase shift timing of the reflected wave.

$$t_{phase} = t_4 + t_1 + t_2 \quad (2)$$

The window function generating unit 23 calculates a tend of an end point of the window function from the processing times $t_1$ and $t_2$ stored in the internal memory, the time to at which the emission control signal is output from the phase shift control signal generating unit 21, and the time $t_3$ of the first transmission process period as illustrated in the following formula (3).

$$t_{end} = t_0 + t_1 + t_2 + t_3 \quad (3)$$

Since transmitting and receiving time required for the reflected wave reflected by the measurement object to return to the reception antenna 13 after the transmission wave is emitted from the transmission antenna 12 is extremely short, the window function generating unit 23 calculates the time $t_{start}$, the time $t_{phase}$, and the time tend without considering the transmitting and receiving time. Note that this is merely an example, and that the window function generating unit 23 may calculate the time $t_{start}$, the time $t_{phase}$, and the time tend considering the transmitting and receiving time.

Figure 5:
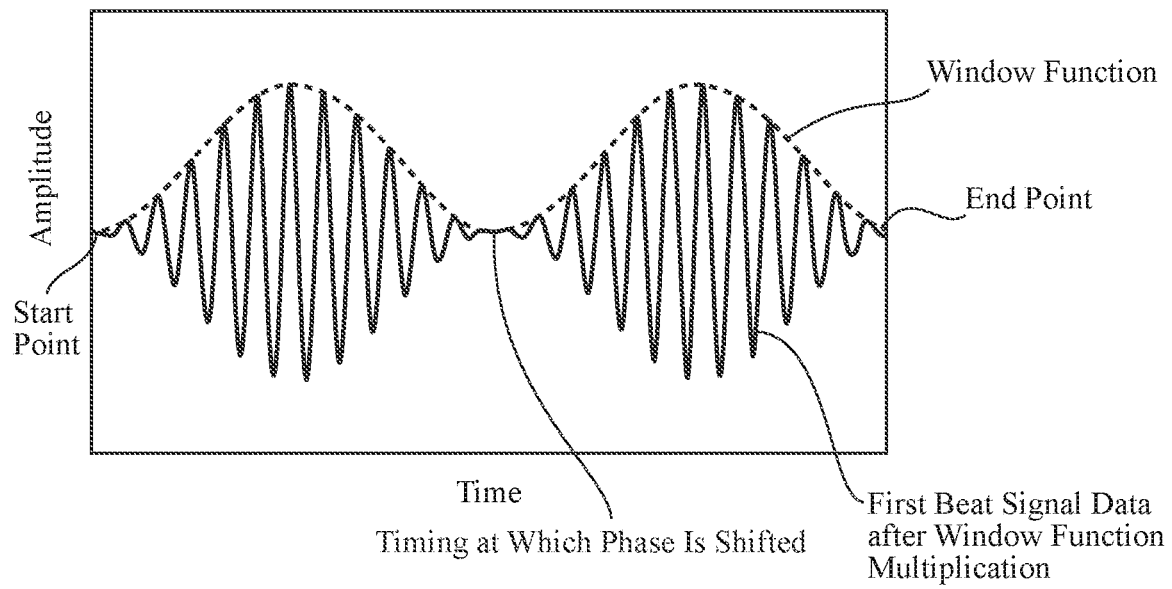
FIG. 5 is an explanatory diagram illustrating an example of a window function generated by a window function generating unit 23 and first beat signal data after window function multiplication.

As illustrated in FIG. 5, the window function generating unit 23 generates a window function that makes the amplitude of the first beat signal data at each of the time $t_{start}$ of the start point and the time tend of the end point zero, and that the amplitude of the first beat signal data at the time $t_{phase}$ at which the phase of the transmission wave is shifted in accordance with the phase shift control signal zero.

FIG. 5 is an explanatory diagram illustrating examples of a window function generated by the window function generating unit 23 and first beat signal data after window function multiplication.

The window function illustrated in FIG. 5 is a window function that makes the amplitude of the first beat signal data at each of the start point and the end point zero, and that makes the amplitude of the first beat signal data at the timing at which the phase of the transmission wave is shifted in accordance with the phase shift control signal zero.

Note that the window function is not limited to one that makes the amplitude of the first beat signal data at each of the points zero as long as the amplitude of the first beat signal data at each of the start point and the end point and the amplitude of the first beat signal data at the timing at which the phase of the transmission wave is shifted in accordance with the phase shift control signal are reduced.

The window function generating unit 23 outputs the generated window function to the window function multiplying unit 24.

When the window function multiplying unit 24 receives the first beat signal data from the beat signal generating unit 11, the window function multiplying unit 24 multiplies the first beat signal data by the window function output from the window function generating unit 23 (step ST3 in FIG. 4).

The window function multiplying unit 24 outputs the first beat signal data after the window function multiplication as illustrated in FIG. 5 to the signal converting unit 25.

When the signal converting unit 25 receives the first beat signal data after the window function multiplication from the window function multiplying unit 24, the signal converting unit 25 calculates first spectrum data that is a signal in a frequency domain by subjecting the first beat signal data after the window function multiplication to FFT (step ST4 in FIG. 4).

The signal converting unit 25 outputs the first spectrum data to the interference wave specification processing unit 27.

Next, operations of the radar device during the second transmission process period will be described. The second transmission process period is, for example, a transmission process period subsequent to the first transmission process period.

The phase shift control signal generating unit 21 outputs an emission control signal indicating emission of a transmission wave to each of the window function generating unit 23 and the beat signal generating unit 11.

During the second transmission process period, the phase shift control signal generating unit 21 stops outputting the phase shift control signal to each of the signal converting unit 25 and the beat signal generating unit 11 (step ST5 in FIG. 4).

When the emission control signal is output from the phase shift control signal generating unit 21, the beat signal generating unit 11 generates a frequency modulation signal, and outputs the frequency modulation signal to the transmission antenna 12.

Since the phase shift control signal is not output from the phase shift control signal generating unit 21 during the second transmission process period, the beat signal generating unit 11 does not shift the phase of the frequency modulation signal during the second transmission process period.

When the transmission antenna 12 receives the frequency modulation signal from the beat signal generating unit 11, the transmission antenna 12 emits the frequency modulation signal into space as a transmission wave.

The transmission wave emitted into space is reflected by the measurement object, and the transmission wave reflected by the measurement object is received by the reception antenna 13 as a reflected wave.

The transmission wave emitted from a radar device different from the radar device illustrated in FIG. 1 is received by the reception antenna 13 as an interference wave.

Therefore, the reception antenna 13 receives each of the reflected wave from the measurement object and the interference wave as a reception wave.

The beat signal generating unit 11 generates a second beat signal having a difference frequency between the transmission wave emitted from the transmission antenna 12 and the reception wave received by the reception antenna 13.

During the second transmission process period, the beat signal generating unit 11 does not shift the phase of the frequency modulation signal. Therefore, the phase of the second beat signal having a difference frequency between the transmission wave and the reflected wave is substantially continuous, and the phase of the second beat signal having a difference frequency between the transmission wave and the interference wave is also substantially continuous.

The beat signal generating unit 11 converts the generated second beat signal from an analog signal to a second digital signal.

The beat signal generating unit 11 outputs the second digital signal as second beat signal data to the window function multiplying unit 24.

When an emission control signal is output from the phase shift control signal generating unit 21, the window function generating unit 23 starts to generate a window function.

The window function generating unit 23 generates the same window function as the window function generated during the first transmission process period, and outputs the generated window function to the window function multiplying unit 24 (step ST6 in FIG. 4).

When the window function multiplying unit 24 receives the second beat signal data from the beat signal generating unit 11, the window function multiplying unit 24 multiplies the second beat signal data by the window function output from the window function generating unit 23 (step ST7 in FIG. 4).

The window function multiplying unit 24 outputs the second beat signal data after the window function multiplication to the signal converting unit 25.

When the signal converting unit 25 receives the second beat signal data after the window function multiplication from the window function multiplying unit 24, the signal converting unit 25 calculates second spectrum data that is a signal in a frequency domain by subjecting the second beat signal data after the window function multiplication to FFT (step ST8 in FIG. 4).

The signal converting unit 25 outputs the second spectrum data to each of the interference wave specification processing unit 27 and the reflected wave specification processing unit 28.

Figure 6:
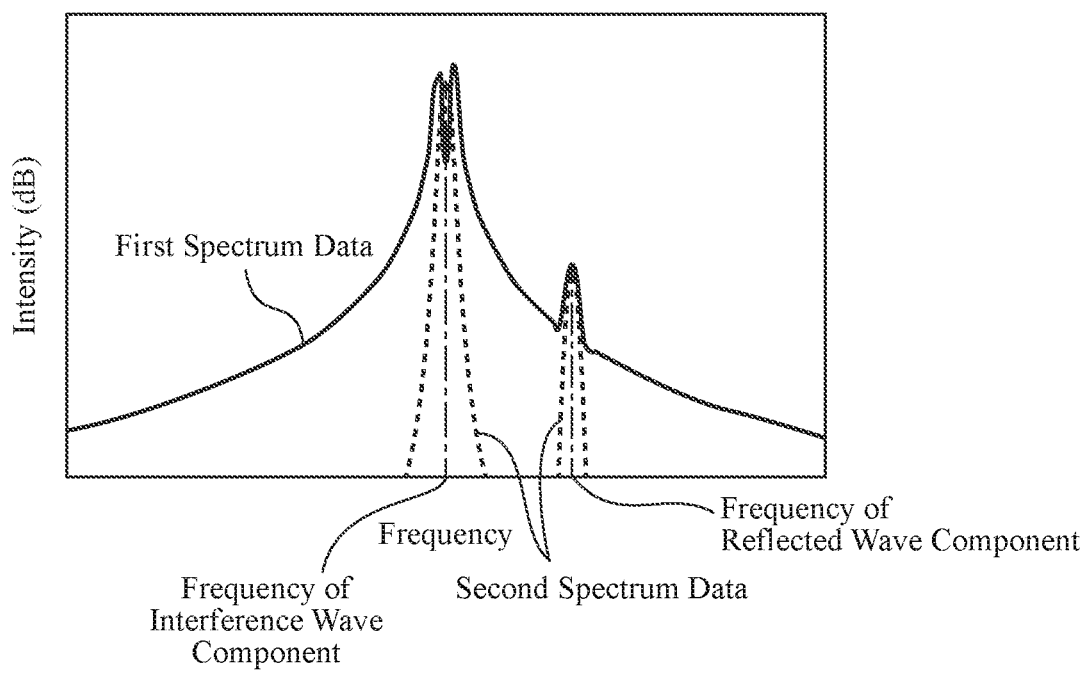
FIG. 6 is an explanatory diagram illustrating examples of first spectrum data and second spectrum data.

FIG. 6 is an explanatory diagram illustrating examples of the first spectrum data and the second spectrum data.

During the first transmission process period, since the phase of the beat signal having a difference frequency between the transmission wave and the interference wave is discontinuous, a plurality of peaks appears at frequencies shifted from the frequency of an interference wave component as in the first spectrum data illustrated in FIG. 6.

During the second transmission process period, since the phase of the beat signal having a difference frequency between the transmission wave and the interference wave is substantially continuous, one peak appears at a frequency of an interference wave component as in the second spectrum data illustrated in FIG. 6. Therefore, the peak related to the interference wave component included in the first spectrum data does not coincide with the peak related to the interference wave component included in the second spectrum data.

Since the phase of the beat signal having a difference frequency between the transmission wave and the reflected wave is substantially continuous in both the first transmission process period and the second transmission process period, one peak appears at a frequency of a reflected wave component as in the first spectrum data and the second spectrum data illustrated in FIG. 6. Therefore, the peak related to the reflected wave component included in the first spectrum data coincides with the peak related to the reflected wave component included in the second spectrum data.

Figure 7:
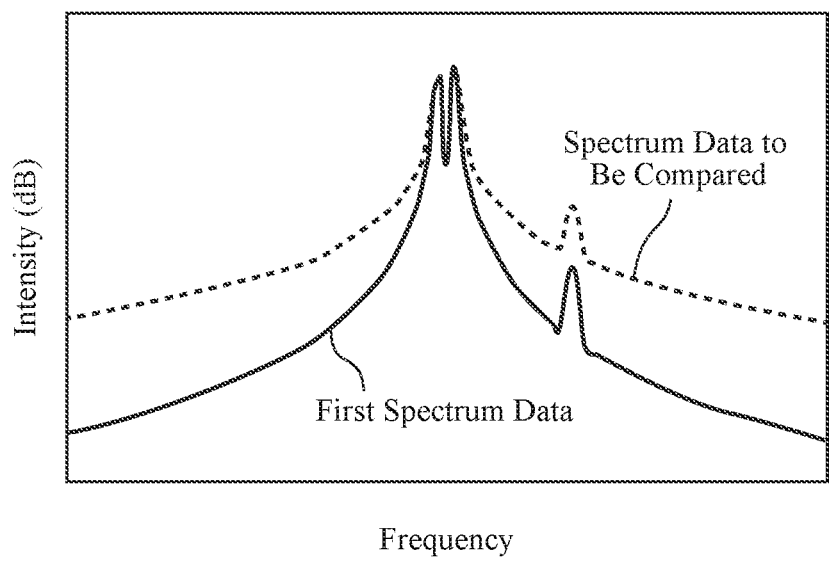
FIG. 7 is an explanatory diagram illustrating first spectrum data calculated by a signal converting unit 25 and spectrum data calculated by subjecting first beat signal data multiplied by a window function of a Hanning window to FFT.

FIG. 7 is an explanatory diagram illustrating the first spectrum data calculated by the signal converting unit 25 and spectrum data calculated by subjecting the first beat signal data multiplied by a window function of a Hanning window to FFT (hereinafter, referred to as "spectrum data to be compared").

The window function of a Hanning window is a window function that sets the amplitude of the first beat signal data at each of the start point and the end point to zero, but a window function that does not set the amplitude of the first beat signal data at the time when the phase of the transmission wave is shifted in accordance with the phase shift control signal to zero and does not reduce the amplitude.

In the spectrum data to be compared, since the amplitude at the time when the phase of the transmission wave is shifted in accordance with the phase shift control signal is not zero, the amplitude at a discontinuous point of a phase is large, and a noise at the discontinuous point of the phase is large among noises included in the first beat signal data. As the noise at the discontinuous point of the phase increases, the signal intensity at a skirt of the spectrum data to be compared is larger than the signal intensity at a skirt of the first spectrum data.

When the signal intensity of a reflection component from the measurement object is small, in the spectrum data to be compared, the reflection component from the measurement object may be buried in a noise included in the first beat signal data. In the first spectrum data, since the signal intensity at a skirt is smaller than that in the spectrum data to be compared, a possibility that a reflection component from the measurement object is buried in a noise included in the first beat signal data is reduced.

In the second spectrum data, similarly to the first spectrum data, since the signal intensity at a skirt is smaller than that in the spectrum data to be compared, a possibility that a reflection component from the measurement object is buried in a noise included in the second beat signal data is reduced.

The interference wave specification processing unit 27 compares the first spectrum data output from the signal converting unit 25 with the second spectrum data output from the signal converting unit 25.

The interference wave specification processing unit 27 specifies a peak that does not coincide with any peak included in the first spectrum data among one or more peaks included in the second spectrum data on the basis of the comparison result between the first spectrum data and the second spectrum data (step ST9 in FIG. 4). Among the one or more peaks included in the second spectrum data, a peak that does not coincide with any peak included in the first spectrum data is a peak related to an interference wave component.

The interference wave specification processing unit 27 outputs frequency information indicating the frequency of the specified peak to the reflected wave specification processing unit 28.

The reflected wave specification processing unit 28 specifies a frequency other than the frequency indicated by the frequency information output from the interference wave specification processing unit 27 among the frequencies of one or more peaks included in the second spectrum data as the frequency of the reflected wave (step ST10 in FIG. 4).

The reflected wave specification processing unit 28 outputs the specified frequency of the reflected wave to the measurement object detecting unit 3.

When the measurement object detecting unit 3 receives the frequency of the reflected wave from the reflected wave specification processing unit 28, the measurement object detecting unit 3 calculates either one or both of a distance to the measurement object and a relative speed to the measurement object from the frequency of the reflected wave.

The process itself for calculating each of the distance to the measurement object and the speed relative to the measurement object from the frequency of the reflected wave is a known technique, and therefore a detailed description thereof is omitted.

In the first embodiment described above, the signal processing device 2 is configured in such a manner that the amplitude reducing unit 22 reduces, when a phase shift control signal indicating phase shift of a transmission wave whose frequency is modulated is output, among amplitudes of a beat signal having a difference frequency between the transmission wave and a reception wave, an amplitude of the beat signal at the timing at which the phase of the transmission wave is shifted in accordance with the phase shift control signal. Therefore, the signal processing device 2 can reduce a noise included in the beat signal having a difference frequency between the transmission wave and the interference wave included in the reception wave.

In the radar device illustrated in FIG. 1, the phase shift control signal generating unit 21 outputs a phase shift control signal only once in one transmission process, and the beat signal generating unit 11 shifts the phase of a frequency modulation signal only once in one transmission process.

However, this is merely an example, and the phase shift control signal generating unit 21 may output the phase shift control signal a plurality of times in one transmission process, and the beat signal generating unit 11 may shift the phase of the frequency modulation signal a plurality of times in one transmission process.

In the radar device illustrated in FIG. 1, the second transmission process period is a transmission process period subsequent to the first transmission process period, and the calculation timings of the first spectrum data and the second spectrum data calculated by the signal converting unit 25 are continuous.

However, this is merely an example, and calculation timings of the first spectrum data and the second spectrum data do not have to be continuous. Therefore, the signal converting unit 25 may calculate the first spectrum data during the first transmission process period, and may calculate the second spectrum data, for example, during a transmission period after the transmission process period subsequent to the first transmission process period.

Second Embodiment

In a second embodiment, a radar device in which a signal converting unit 56 includes a first signal conversion processing unit 57 and a second signal conversion processing unit 58 will be described.

Figure 8:
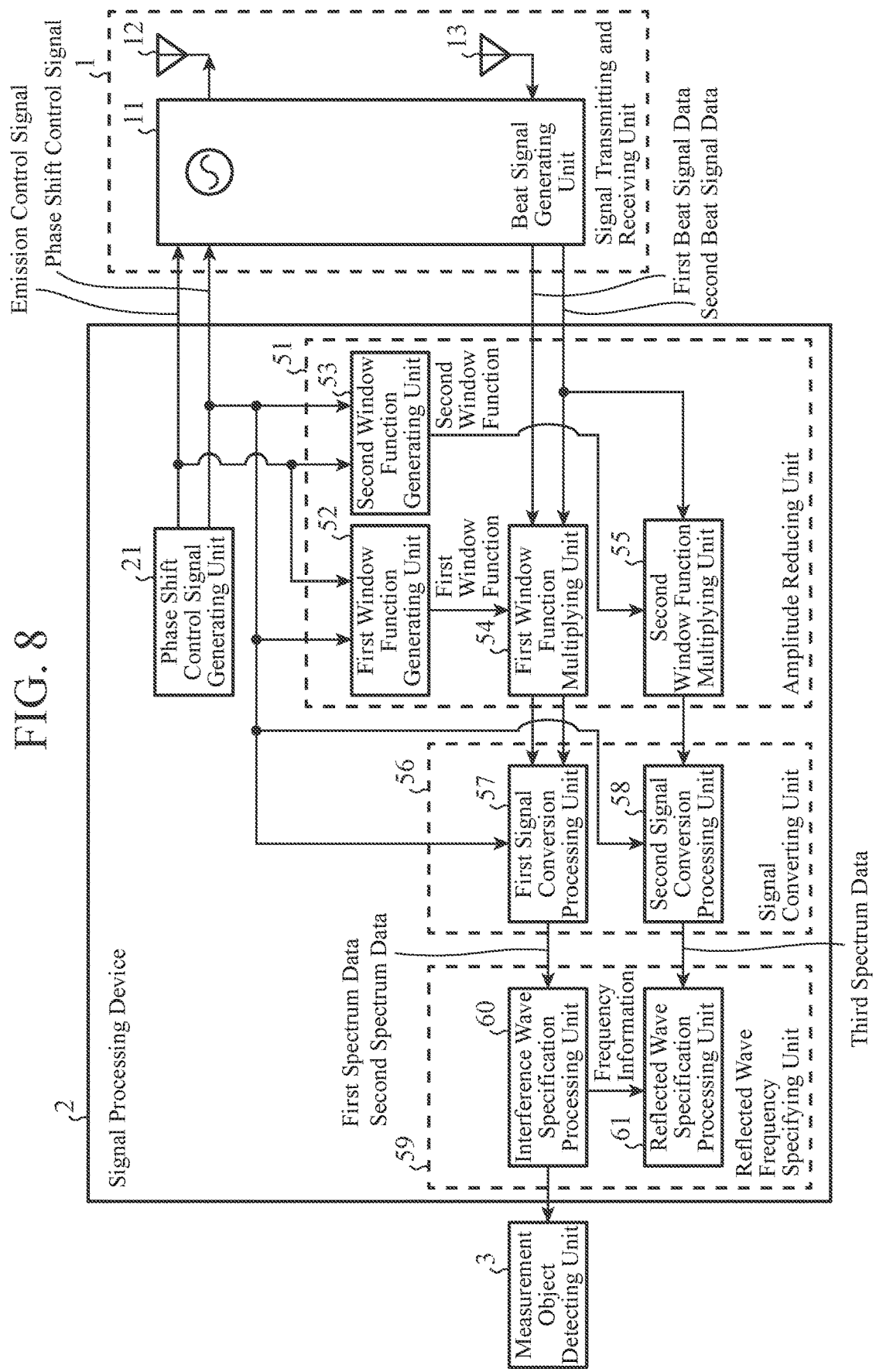
FIG. 8 is a configuration diagram illustrating a radar device according to a second embodiment.

FIG. 8 is a configuration diagram illustrating the radar device according to the second embodiment.

Figure 9:
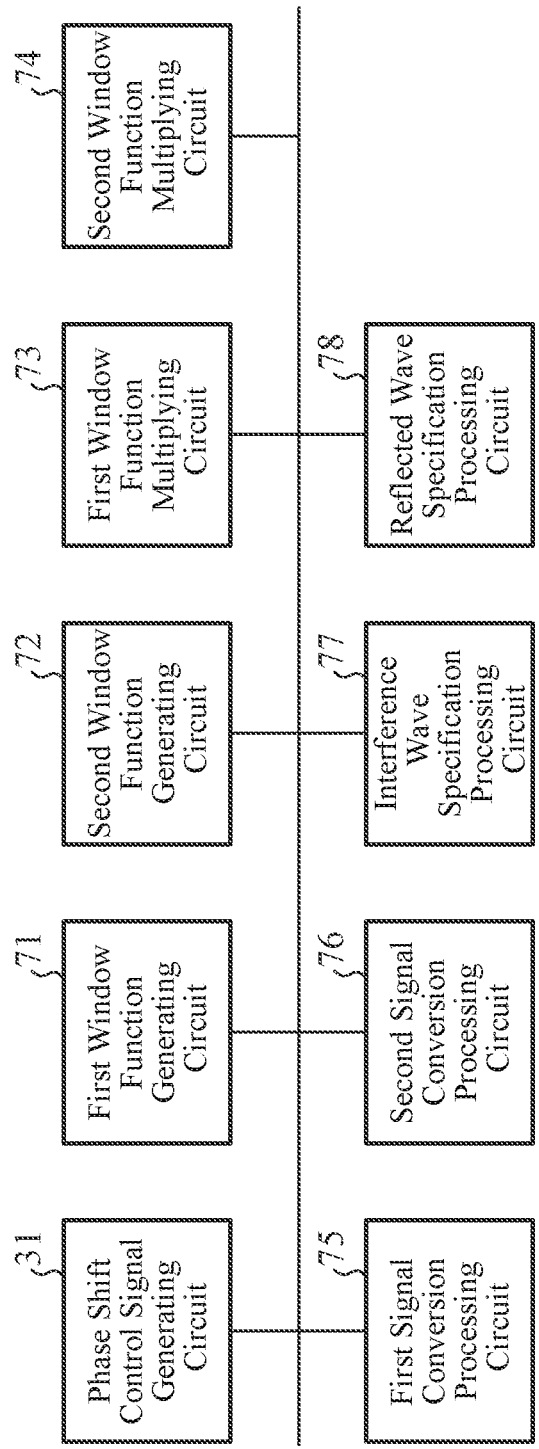
FIG. 9 is a hardware configuration diagram illustrating hardware of a signal processing device 2 included in the radar device according to the second embodiment.

FIG. 9 is a hardware configuration diagram illustrating hardware of a signal processing device 2 included in the radar device according to the second embodiment.

In FIGS. 8 and 9, the same reference numerals as in FIGS. 1 and 2 indicate the same or corresponding parts, and therefore description thereof is omitted.

An amplitude reducing unit 51 includes a first window function generating unit 52, a second window function generating unit 53, a first window function multiplying unit 54, and a second window function multiplying unit 55.

The first window function generating unit 52 is implemented by, for example, a first window function generating circuit 71 illustrated in FIG. 9.

When an emission control signal is output from a phase shift control signal generating unit 21, the first window function generating unit 52 starts to generate a first window function.

The first window function generating unit 52 generates the first window function for reducing, among amplitudes of a first beat signal, an amplitude of the first beat signal data at a timing at which the phase of a transmission wave is shifted in accordance with the phase shift control signal output from the phase shift control signal generating unit 21.

The first window function generating unit 52 outputs the generated first window function to the first window function multiplying unit 54.

The second window function generating unit 53 is implemented by, for example, a second window function generating circuit 72 illustrated in FIG. 9.

When the emission control signal is output from the phase shift control signal generating unit 21, the second window function generating unit 53 starts to generate a second window function.

The second window function generating unit 53 generates the second window function that does not reduce, among amplitudes of a second beat signal data, an amplitude of the second beat signal data at a timing at which the phase of a transmission wave is shifted in accordance with the phase shift control signal.

The second window function is a window function having a value that does not reduce the amplitude of the second beat signal data at the timing when the phase of the transmission wave is shifted in accordance with the phase shift control signal.

The second window function generating unit 53 outputs the generated second window function to the second window function multiplying unit 55.

The first window function multiplying unit 54 is implemented by, for example, a first window function multiplying circuit 73 illustrated in FIG. 9.

During the first transmission process period, the first window function multiplying unit 54 multiplies the first beat signal data output from the beat signal generating unit 11 by the first window function generated by the first window function generating unit 52.

The first window function multiplying unit 54 outputs the first beat signal data after the first window function multiplication to the first signal conversion processing unit 57.

During the second transmission process period, the first window function multiplying unit 54 multiplies the second beat signal data output from the beat signal generating unit 11 by the first window function generated by the first window function generating unit 52.

The first window function multiplying unit 54 outputs the second beat signal data after the first window function multiplication to the first signal conversion processing unit 57.

The second window function multiplying unit 55 is implemented by, for example, a second window function multiplying circuit 74 illustrated in FIG. 9.

The second window function multiplying unit 55 multiplies the second beat signal data output from the beat signal generating unit 11 by the second window function generated by the second window function generating unit 53.

The second window function multiplying unit 55 outputs the second beat signal data after the second window function multiplication to the second signal conversion processing unit 58.

The signal converting unit 56 includes the first signal conversion processing unit 57 and the second signal conversion processing unit 58.

The first signal conversion processing unit 57 is implemented by, for example, a first signal conversion processing circuit 75 illustrated in FIG. 9.

During the first transmission process period, the first signal conversion processing unit 57 converts the first beat signal data after the first window function multiplication by the first window function multiplying unit 54 into a signal in a frequency domain as first spectrum data.

The first signal conversion processing unit 57 outputs the first spectrum data to an interference wave specification processing unit 60 described later of the reflected wave frequency specifying unit 59.

During the second transmission process period, the first signal conversion processing unit 57 converts the second beat signal data after the first window function multiplication by the first window function multiplying unit 54 into a signal in a frequency domain as second spectrum data.

The first signal conversion processing unit 57 outputs the second spectrum data to the interference wave specification processing unit 60 of the reflected wave frequency specifying unit 59.

The second signal conversion processing unit 58 is implemented by, for example, a second signal conversion processing circuit 76 illustrated in FIG. 9.

The second signal conversion processing unit 58 converts the second beat signal data after the second window function multiplication by the second window function multiplying unit 55 into a signal in a frequency domain as third spectrum data.

The second signal conversion processing unit 58 outputs the third spectrum data to a reflected wave specification processing unit 61 described later of the reflected wave frequency specifying unit 59.

The reflected wave frequency specifying unit 59 includes the interference wave specification processing unit 60 and the reflected wave specification processing unit 61.

The interference wave specification processing unit 60 is implemented by, for example, an interference wave specification processing circuit 77 illustrated in FIG. 9.

The interference wave specification processing unit 60 acquires each of the first spectrum data and the second spectrum data output from the first signal conversion processing unit 57.

The interference wave specification processing unit 60 specifies a peak that does not coincide with any peak included in the first spectrum data among one or more peaks included in the second spectrum data.

The interference wave specification processing unit 60 outputs frequency information indicating the frequency of the specified peak to the reflected wave specification processing unit 61.

The reflected wave specification processing unit 61 is implemented by, for example, a reflected wave specification processing circuit 78 illustrated in FIG. 9.

The reflected wave specification processing unit 61 specifies the frequency of the reflected wave from among the frequencies of one or more peaks included in the third spectrum data output from the second signal conversion processing unit 58 on the basis of the frequency information output from the interference wave specification processing unit 60.

The reflected wave specification processing unit 61 outputs the specified frequency of the reflected wave to the measurement object detecting unit 3.

In FIG. 8, it is assumed that each of the phase shift control signal generating unit 21, the first window function generating unit 52, the second window function generating unit 53, the first window function multiplying unit 54, the second window function multiplying unit 55, the first signal conversion processing unit 57, the second signal conversion processing unit 58, the interference wave specification processing unit 60, and the reflected wave specification processing unit 61, which are constituent elements of the signal processing device 2, is implemented by dedicated hardware as illustrated in FIG. 9. That is, it is assumed that the signal processing device 2 is implemented by the first window function generating circuit 71, the second window function generating circuit 72, the first window function multiplying circuit 73, the second window function multiplying circuit 74, the first signal conversion processing circuit 75, the second signal conversion processing circuit 76, the interference wave specification processing circuit 77, and the reflected wave specification processing circuit 78.

Here, each of the first window function generating circuit 71, the second window function generating circuit 72, the first window function multiplying circuit 73, the second window function multiplying circuit 74, the first signal conversion processing circuit 75, the second signal conversion processing circuit 76, the interference wave specification processing circuit 77, and the reflected wave specification processing circuit 78 corresponds to, for example, a single circuit, a composite circuit, a programmed processor, a parallel-programmed processor, ASIC, FPGA, or a combination thereof.

The constituent elements of the signal processing device 2 are not limited to those implemented by dedicated hardware, and the signal processing device 2 may be implemented by software, firmware, or a combination of software and firmware.

When the signal processing device 2 is implemented by software, firmware, or the like, a program for causing a computer to execute processing procedures performed by the phase shift control signal generating unit 21, the first window function generating unit 52, the second window function generating unit 53, the first window function multiplying unit 54, the second window function multiplying unit 55, the first signal conversion processing unit 57, the second signal conversion processing unit 58, the interference wave specification processing unit 60, and the reflected wave specification processing unit 61 is stored in a memory 41 illustrated in FIG. 3. Then, a processor 42 illustrated in FIG. 3 executes the program stored in the memory 41.

FIG. 9 illustrates an example in which each of the constituent elements of the signal processing device 2 is implemented by dedicated hardware, and FIG. 3 illustrates an example in which the signal processing device 2 is implemented by software, firmware, or the like. However, this is only an example, and some constituent elements in the signal processing device 2 may be implemented by dedicated hardware, and the remaining constituent elements may be implemented by software, firmware, or the like.

Next, operations of the radar device illustrated in FIG. 8 will be described.

In the radar device illustrated in FIG. 1, the window function multiplying unit 24 multiplies each of the first beat signal data and the second beat signal data by a window function. Then, by subjecting each of the first beat signal data after the window function multiplication and the second beat signal data after the window function multiplication to FFT, the signal converting unit 25 reduces a noise generated at a skirt of the first spectrum data and reduces a noise generated at a skirt of the second spectrum data.

Figure 10:
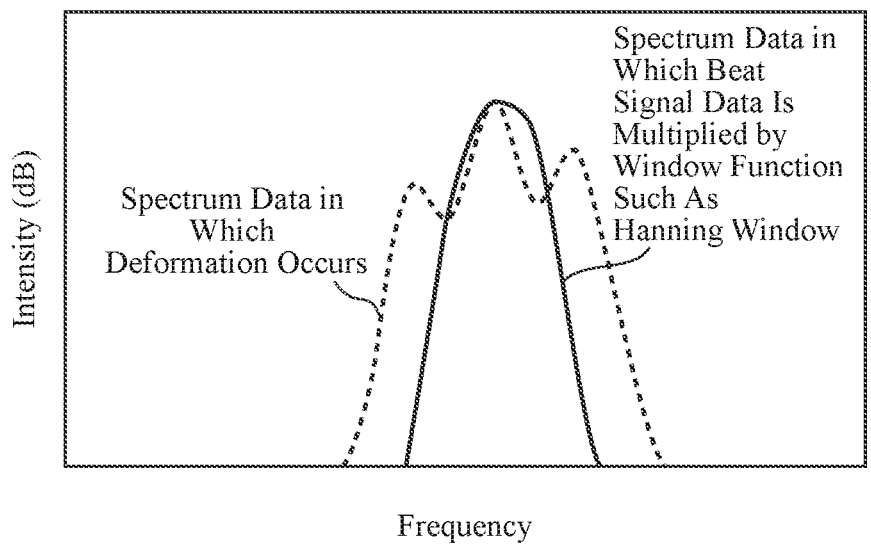
FIG. 10 is an explanatory diagram illustrating an example in which a plurality of peaks is generated due to deformation of spectrum data.

However, depending on a condition of periodicity of the window function generated by the window function generating unit 23 or a condition of a 1-bit width of FFT, spectrum data related to a beat signal having a difference frequency between a transmission wave and a reflected wave is deformed, and a plurality of peaks may be generated as illustrated in FIG. 10.

FIG. 10 is an explanatory diagram illustrating an example in which a plurality of peaks is generated due to deformation of spectrum data.

In the radar device illustrated in FIG. 1, when a plurality of peaks is generated in spectrum data related to a beat signal having a difference frequency between a transmission wave and a reflected wave, it is difficult for the reflected wave specification processing unit 28 to specify the frequency of the reflected wave.

When the beat signal data is multiplied by a window function such as a Hanning window having a value that does not reduce the amplitude of beat signal data at a timing when the phase of a transmission wave is shifted in accordance with a phase shift control signal, as illustrated in FIG. 10, deformation does not occur in the spectrum data related to the beat signal data having a difference frequency between the transmission wave and a reflected wave.

First, operations of the radar device during the first transmission process period will be described.

First of all, the phase shift control signal generating unit 21 outputs an emission control signal indicating emission of a transmission wave to each of the first window function generating unit 52, the second window function generating unit 53, and the beat signal generating unit 11.

When the emission control signal is output from the phase shift control signal generating unit 21, the beat signal generating unit 11 generates a frequency modulation signal, and outputs the frequency modulation signal to the transmission antenna 12.

When a certain period of time elapses after the phase shift control signal generating unit 21 outputs the emission control signal, the phase shift control signal generating unit 21 outputs a phase shift control signal indicating phase shift of a transmission wave to each of the first window function generating unit 52, the second window function generating unit 53, the first signal conversion processing unit 57, the second signal conversion processing unit 58, and the beat signal generating unit 11.

When a phase shift control signal is output from the phase shift control signal generating unit 21 during the first transmission process period, the beat signal generating unit 11 shifts the phase of the generated frequency modulation signal in accordance with the phase shift control signal, and outputs the frequency modulation signal after the phase shift to the transmission antenna 12.

When the transmission antenna 12 receives the frequency modulation signal from the beat signal generating unit 11, the transmission antenna 12 emits the frequency modulation signal into space as a transmission wave.

The transmission wave emitted into space is reflected by the measurement object, and the transmission wave reflected by the measurement object is received by the reception antenna 13 as a reflected wave.

In the radar device illustrated in FIG. 8, it is assumed that a transmission wave whose frequency is modulated is emitted from a radar device different from the radar device illustrated in FIG. 8. However, the phase of the transmission wave emitted from a radar device different from the radar device illustrated in FIG. 8 is not shifted while the frequency is modulated.

The transmission wave emitted from a radar device different from the radar device illustrated in FIG. 8 is received by the reception antenna 13 as an interference wave.

Therefore, the reception antenna 13 receives each of the reflected wave from the measurement object and the interference wave as a reception wave.

The beat signal generating unit 11 generates a first beat signal having a difference frequency between the transmission wave emitted from the transmission antenna 12 and the reception wave received by the reception antenna 13.

The beat signal generating unit 11 converts the generated first beat signal from an analog signal to a first digital signal.

The beat signal generating unit 11 outputs the first digital signal as first beat signal data to the first window function generating unit 52.

When an emission control signal is output from the phase shift control signal generating unit 21, the first window function generating unit 52 starts to generate a window function.

When a phase shift control signal is output from the phase shift control signal generating unit 21, the first window function generating unit 52 generates a first window function for reducing, among amplitudes of the first beat signal data output from the beat signal generating unit 11, an amplitude of the first beat signal data at a timing at which the phase of the transmission wave is shifted in accordance with the phase shift control signal.

The first window function generated by the first window function generating unit 52 is the same window function as the window function generated by the window function generating unit 23 illustrated in FIG. 1.

The first window function generating unit 52 outputs the generated first window function to the first window function multiplying unit 54.

When an emission control signal is output from the phase shift control signal generating unit 21, the second window function generating unit 53 starts to generate a window function.

The second window function generating unit 53 generates a second window function that does not reduce, among amplitudes of the second beat signal data output from the beat signal generating unit 11, an amplitude at a timing at which the phase of the transmission wave is shifted in accordance with the phase shift control signal.

Figure 11:
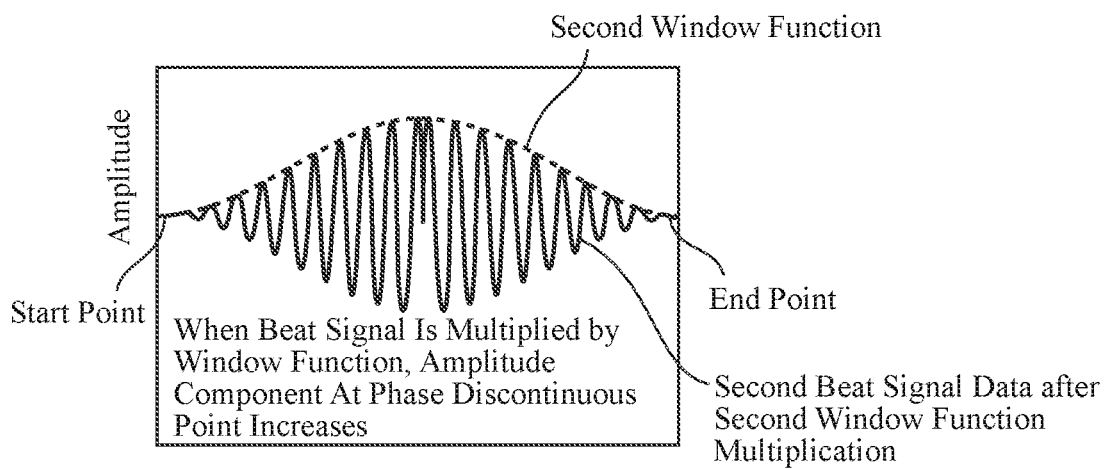
FIG. 11 is an explanatory diagram illustrating examples of a second window function generated by a second window function generating unit 53 and second beat signal data after second window function multiplication.

As illustrated in FIG. 11, the second window function is a window function having a value that does not reduce the amplitude of the second beat signal data at the timing at which the phase of the transmission wave is shifted in accordance with the phase shift control signal.

FIG. 11 is an explanatory diagram illustrating examples of the second window function generated by the second window function generating unit 53 and the second beat signal data after second window function multiplication. The second window function is, for example, a window function of a Hanning window.

The second window function generating unit 53 outputs the generated second window function to the second window function multiplying unit 55.

Here, the second window function generating unit 53 generates the second window function during the first transmission process period. However, this is merely an example, and the second window function generating unit 53 may generate the second window function during the second transmission process period.

When the first window function multiplying unit 54 receives the first beat signal data from the beat signal generating unit 11, the first window function multiplying unit 54 multiplies the first beat signal data by the first window function output from the first window function generating unit 52.

The first window function multiplying unit 54 outputs the first beat signal data after the first window function multiplication to the first signal conversion processing unit 57.

When the first signal conversion processing unit 57 receives the first beat signal data after the first window function multiplication from the first window function multiplying unit 54, the first signal conversion processing unit 57 calculates first spectrum data that is a signal in a frequency domain by subjecting the first beat signal data after the first window function multiplication to FFT.

The first signal conversion processing unit 57 outputs the first spectrum data to the interference wave specification processing unit 60.

Next, operations of the radar device during the second transmission process period will be described.

The phase shift control signal generating unit 21 outputs an emission control signal indicating emission of a transmission wave to each of the first window function generating unit 52, the second window function generating unit 53, and the beat signal generating unit 11.

During the second transmission process period, the phase shift control signal generating unit 21 stops outputting the phase shift control signal to each of the first window function generating unit 52, the second window function generating unit 53, the first signal conversion processing unit 57, the second signal conversion processing unit 58, and the beat signal generating unit 11.

When the emission control signal is output from the phase shift control signal generating unit 21, the beat signal generating unit 11 generates a frequency modulation signal, and outputs the frequency modulation signal to the transmission antenna 12.

Since the phase shift control signal is not output from the phase shift control signal generating unit 21 during the second transmission process period, the beat signal generating unit 11 does not shift the phase of the generated frequency modulation signal.

When the transmission antenna 12 receives the frequency modulation signal from the beat signal generating unit 11, the transmission antenna 12 emits the frequency modulation signal into space as a transmission wave.

The transmission wave emitted into space is reflected by the measurement object, and the transmission wave reflected by the measurement object is received by the reception antenna 13 as a reflected wave.

The transmission wave emitted from a radar device different from the radar device illustrated in FIG. 8 is received by the reception antenna 13 as an interference wave.

Therefore, the reception antenna 13 receives each of the reflected wave from the measurement object and the interference wave as a reception wave.

The beat signal generating unit 11 generates a second beat signal having a difference frequency between the transmission wave emitted from the transmission antenna 12 and the reception wave received by the reception antenna 13.

The beat signal generating unit 11 converts the generated second beat signal from an analog signal to a second digital signal.

The beat signal generating unit 11 outputs the second digital signal as second beat signal data to each of the first window function multiplying unit 54 and the second window function multiplying unit 55.

When an emission control signal is output from a phase shift control signal generating unit 21, the first window function generating unit 52 starts to generate a first window function.

The first window function generating unit 52 generates the same window function as the first window function generated during the first transmission process period, and outputs the generated first window function to the first window function multiplying unit 54.

When the first window function multiplying unit 54 receives the second beat signal data output from the beat signal generating unit 11, the first window function multiplying unit 54 multiplies the second beat signal data by the first window function output from the first window function generating unit 52.

The first window function multiplying unit 54 outputs the second beat signal data after the first window function multiplication to the first signal conversion processing unit 57.

When the second window function multiplying unit 55 receives the second beat signal data output from the beat signal generating unit 11, the second window function multiplying unit 55 multiplies the second beat signal data by the second window function output from the second window function generating unit 53.

The second window function multiplying unit 55 outputs the second beat signal data after the second window function multiplication to the second signal conversion processing unit 58.

When the first signal conversion processing unit 57 receives the second beat signal data after the first window function multiplication from the first window function multiplying unit 54, the first signal conversion processing unit 57 calculates second spectrum data that is a signal in a frequency domain by subjecting the second beat signal data after the first window function multiplication to FFT.

The first signal conversion processing unit 57 outputs the second spectrum data to the interference wave specification processing unit 60.

When the second signal conversion processing unit 58 receives the second beat signal data after the second window function multiplication from the second window function multiplying unit 55, the second signal conversion processing unit 58 calculates third spectrum data that is a signal in a frequency domain by subjecting the second beat signal data after the second window function multiplication to FFT.

The second signal conversion processing unit 58 outputs the third spectrum data to the reflected wave specification processing unit 61.

Figure 12:
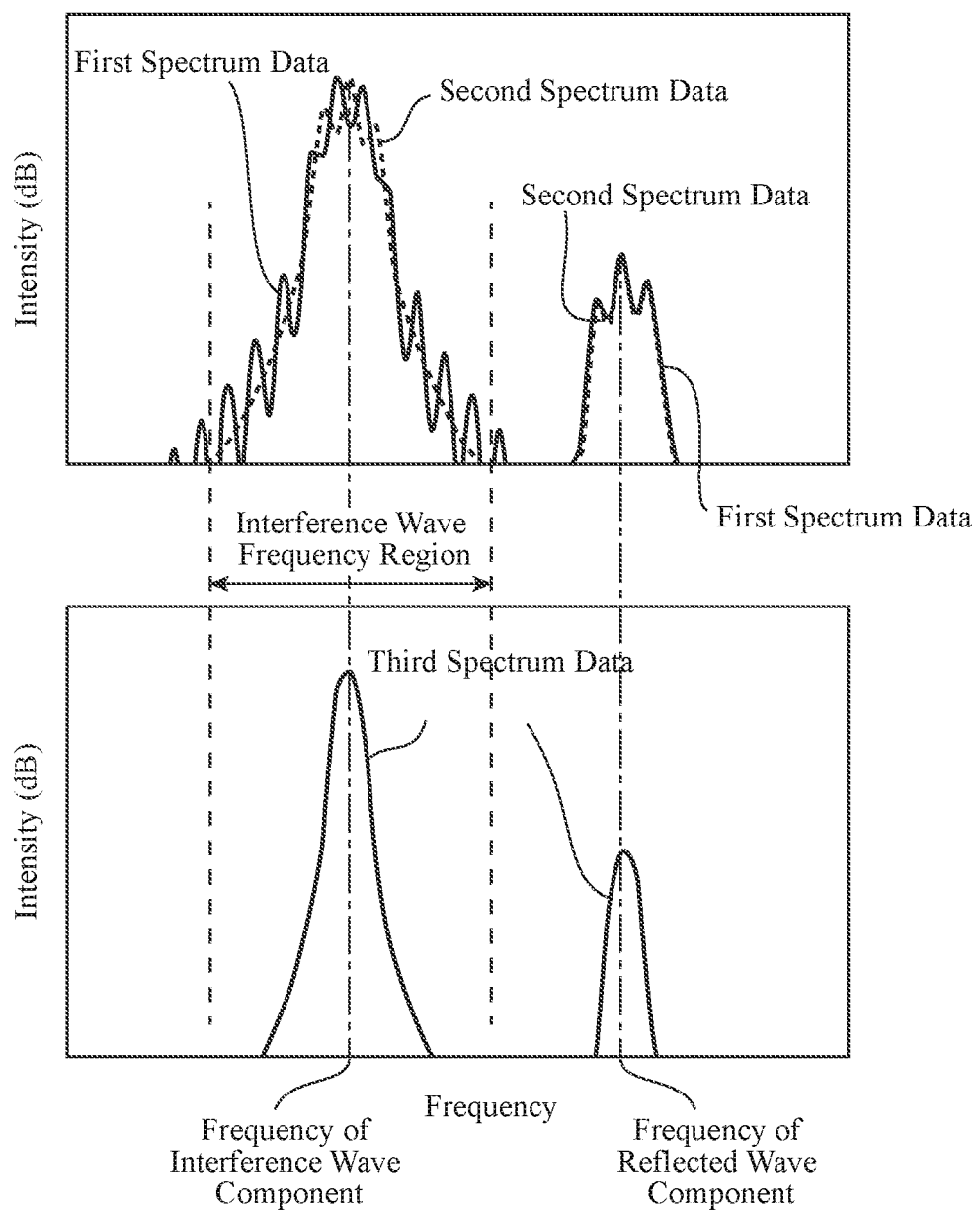
FIG. 12 is an explanatory diagram illustrating examples of first spectrum data, second spectrum data, and third spectrum data.

FIG. 12 is an explanatory diagram illustrating examples of the first spectrum data, the second spectrum data, and the third spectrum data.

During the first transmission process period, since the phase of the beat signal having a difference frequency between the transmission wave and the interference wave is discontinuous, a plurality of peaks appears at frequencies shifted from the frequency of an interference wave component as in the first spectrum data illustrated in FIG. 12.

Even during the second transmission process period, since the second spectrum data is deformed due to a condition of periodicity of the first window function or the like, as illustrated in FIG. 12, a plurality of peaks appears in the second spectrum data as a peak of an interference wave component.

A cause of appearance of a plurality of peaks related to an interference wave component in the first spectrum data is different from a cause of appearance of a plurality of peaks related to an interference wave component in the second spectrum data. Due to a difference in a cause of appearance of a plurality of peaks, as illustrated in FIG. 12, the peak related to the interference wave component included in the first spectrum data does not coincide with the peak related to the interference wave component included in the second spectrum data.

During the first transmission process period, since the first spectrum data is deformed due to a condition of periodicity of the first window function or the like, as illustrated in FIG. 12, a plurality of peaks appears in the first spectrum data as a peak of a reflected wave component.

Even during the second transmission process period, since the second spectrum data is deformed due to a condition of periodicity of the first window function or the like, as illustrated in FIG. 12, a plurality of peaks appears in the second spectrum data as a peak of a reflected wave component.

A cause of appearance of a plurality of peaks related to a reflected wave component in the first spectrum data is the same as a cause of appearance of a plurality of peaks related to a reflected wave component in the second spectrum data. Due to the same cause of appearance of a plurality of peaks, as illustrated in FIG. 12, the peak related to the reflected wave component included in the first spectrum data coincides with the peak related to the reflected wave component included in the second spectrum data.

The interference wave specification processing unit 60 compares the first spectrum data output from the first signal conversion processing unit 57 with the second spectrum data output from the first signal conversion processing unit 57.

The interference wave specification processing unit 60 specifies a peak that does not coincide with any peak included in the first spectrum data among one or more peaks included in the second spectrum data on the basis of the comparison result between the first spectrum data and the second spectrum data. Among the one or more peaks included in the second spectrum data, a peak that does not coincide with any peak included in the first spectrum data is a peak related to an interference wave component.

The interference wave specification processing unit 60 outputs frequency information indicating the frequencies of the specified one or more peaks to the reflected wave specification processing unit 61.

The reflected wave specification processing unit 61 acquires the third spectrum data output from the second signal conversion processing unit 58.

The second window function is a window function that does not cause deformation in spectrum data, and the third spectrum data is obtained by subjecting the second beat signal data after second window function multiplication to FFT. Therefore, in the third spectrum data, as illustrated in FIG. 12, one peak appears at the frequency of an interference wave component, and one peak appears at the frequency of a reflected wave component.

Among the frequencies of one or more peaks included in the third spectrum data, a frequency approximate to the frequency indicated by the frequency information is likely to be the frequency of the interference wave.

The reflected wave specification processing unit 61 specifies the frequency of the reflected wave from among the frequencies of one or more peaks included in the third spectrum data on the basis of the frequency information output from the interference wave specification processing unit 50.

For example, among the frequencies of one or more peaks included in the third spectrum data, the reflected wave specification processing unit 61 specifies a frequency separated by a value equal to or more than a threshold from all the frequencies of one or more peaks indicated by the frequency information output from the interference wave specification processing unit 60 as the frequency of the reflected wave. The threshold may be stored in an internal memory of the reflected wave specification processing unit 61 or may be given from the outside of the signal processing device 2.

The reflected wave specification processing unit 61 outputs the specified frequency of the reflected wave to the measurement object detecting unit 3.

When the measurement object detecting unit 3 receives the frequency of the reflected wave from the reflected wave specification processing unit 61, the measurement object detecting unit 3 calculates either one or both of a distance to the measurement object and a relative speed to the measurement object from the frequency of the reflected wave.

In the second embodiment described above, the interference wave specification processing unit 60 specifies a peak that does not coincide with any peak included in the first spectrum data among one or more peaks included in the second spectrum data, and outputs frequency information indicating the frequency of the specified peak to the reflected wave specification processing unit 61. The signal processing device 2 illustrated in FIG. 8 is configured in such a manner that the reflected wave specification processing unit 61 specifies the frequency of the reflected wave from among the frequencies of one or more peaks included in the third spectrum data on the basis of the frequency information output from the interference wave specification processing unit 60. Therefore, similarly to the signal processing device 2 illustrated in FIG. 1, the signal processing device 2 illustrated in FIG. 8 can reduce a noise included in a beat signal having a difference frequency between a transmission wave and an interference wave included in a reception wave, and can specify the frequency of a reflected wave even when a plurality of peaks appears due to a condition of periodicity of the first window function or the like.

In the radar device illustrated in FIG. 8, the phase shift control signal generating unit 21 outputs a phase shift control signal only once in one transmission process, and the beat signal generating unit 11 shifts the phase of a frequency modulation signal only once in one transmission process.

However, this is merely an example, and the phase shift control signal generating unit 21 may output the phase shift control signal a plurality of times in one transmission process, and the beat signal generating unit 11 may shift the phase of the frequency modulation signal a plurality of times in one transmission process.

In the radar device illustrated in FIG. 8, the second transmission process period is a transmission process period subsequent to the first transmission process period, and the calculation timings of the first spectrum data and the second spectrum data calculated by the first signal conversion processing unit 57 are continuous.

However, this is merely an example, and calculation timings of the first spectrum data and the second spectrum data do not have to be continuous. Therefore, the first signal conversion processing unit 57 may calculate the first spectrum data during the first transmission process period, and may calculate the second spectrum data, for example, during a transmission period after the transmission process period subsequent to the first transmission process period.

Note that free combinations of the embodiments, modifications to any components of the embodiments, or omissions of any components of the embodiments are possible within the scope of the present invention.

INDUSTRIAL APPLICABILITY

The present invention is suitable for a signal processing device and a radar device for converting a beat signal having a difference frequency between a transmission wave and a reception wave into a signal in a frequency domain.

REFERENCE SIGNS LIST

1: signal transmitting and receiving unit, 2: signal processing device, 3: measurement object detecting unit, 11: beat signal generating unit, 12: transmission antenna, 13: reception antenna, 21: phase shift control signal generating unit, 22: amplitude reducing unit, 23: window function generating unit, 24: window function multiplying unit, 25: signal converting unit, 26: reflected wave frequency specifying unit, 27: interference wave specification processing unit, 28: reflected wave specification processing unit, 31: phase shift control signal generating circuit, 32: window function generating circuit, 33: window function multiplying circuit, 34: signal converting circuit, 35: interference wave specification processing circuit, 36: reflected wave specification processing circuit, 41: memory, 42: processor, 51: amplitude reducing unit, 52: first window function generating unit, 53: second window function generating unit, 54: first window function multiplying unit, 55: second window function multiplying unit, 56: signal converting unit, 57: first signal conversion processing unit, 58: second signal conversion processing unit, 59: reflected wave frequency specifying unit, 60: interference wave specification processing unit, 61: reflected wave specification processing unit, 71: first window function generating circuit, 72: second window function generating circuit, 73: first window function multiplying circuit, 74: second window function multiplying circuit, 75: first signal conversion processing circuit, 76: second signal conversion processing circuit, 77: interference wave specification processing circuit, 78: reflected wave specification processing circuit

The invention claimed is:

1. A signal processing device comprising:
processing circuitry configured to:
reduce, based on a phase shift control signal indicating phase shift of a transmission wave whose frequency is modulated is output at a timing at which phase of the transmission wave is shifted discontinuously during changing frequency of the transmission wave, among amplitudes of a beat signal having a difference frequency between the transmission wave and a reception wave, an amplitude of the beat signal at a timing at which a phase of the transmission wave is shifted in accordance with the phase shift control signal; and
convert the beat signal whose amplitude at the timing is reduced into a signal in a frequency domain.

2. The signal processing device according to claim 1, wherein the processing circuitry is further configured to output the phase shift control signal indicating phase shift of the transmission wave whose frequency is modulated.

3. The signal processing device according to claim 2, wherein
the processing circuitry is further configured:
to generate, when the phase shift control signal is output, a window function for reducing, among the amplitudes of the beat signal having the difference frequency between the transmission wave and the reception wave, the amplitude of the beat signal at the timing at which the phase of the transmission wave is shifted in accordance with the phase shift control signal;
to multiply the beat signal having the difference frequency between the transmission wave and the reception wave by the generated window function; and
to convert the beat signal after the window function multiplication into a signal in a frequency domain.

4. The signal processing device according to claim 3, wherein
the phase shift control signal is output during a first transmission process period, and the phase shift control signal is not output during a second transmission process period,
the processing circuitry multiplies a first beat signal that is a beat signal having a difference frequency between a transmission wave whose phase is shifted during the first transmission process period and a reception wave by the window function during the first transmission process period, and multiplies a second beat signal that is a beat signal having a difference frequency between a transmission wave whose phase is not shifted during the second transmission process period and a reception wave by the window function during the second transmission process period,
the processing circuitry converts the first beat signal after the window function multiplication into a signal in a frequency domain as first spectrum data during the first transmission process period, and converts the second beat signal after the window function multiplication into a signal in a frequency domain as second spectrum data during the second transmission process period, and the processing circuitry is further configured to compare the first spectrum data with the second spectrum data, and to specify, out of a reflected wave from a measurement object and an interference wave included in the reception wave, a frequency of the reflected wave on a basis of a comparison result between the first spectrum data and the second spectrum data.

5. The signal processing device according to claim 4, wherein
the processing circuitry is further configured:
to specify a peak that does not coincide with any peak included in the first spectrum data among one or more peaks included in the second spectrum data, and to output frequency information indicating a frequency of the specified peak; and
to specify a frequency other than the frequency indicated by the output frequency information among frequencies of one or more peaks included in the second spectrum data as a frequency of the reflected wave.

6. The signal processing device according to claim 2, wherein
the phase shift control signal is output during a first transmission process period, and the phase shift control signal is not output during a second transmission process period,
the processing circuitry is further configured:
to generate a first window function for reducing, among amplitudes of a first beat signal having a difference frequency between a transmission wave whose phase is shifted during the first transmission process period and a reception wave, an amplitude of the first beat signal at a timing at which the phase of the transmission wave is shifted in accordance with the phase shift control signal during the first transmission process period;
to generate a second window function for not reducing, among amplitudes of a second beat signal having a difference frequency between a transmission wave whose phase is not shifted during the second transmission process period and a reception wave, an amplitude of the second beat signal at the timing during the second transmission process period;
to multiply the first beat signal by the first window function during the first transmission process period, and multiply the second beat signal by the first window function during the second transmission process period;
to multiply the second beat signal by the second window function;
to convert the first beat signal after the first window function multiplication into a signal in a frequency domain as first spectrum data during the first transmission process period, and convert the second beat signal after the first window function multiplication into a signal in a frequency domain as second spectrum data during the second transmission process period; and
to convert the second beat signal after the second window function multiplication into a signal in a frequency domain as third spectrum data; and
to specify, out of a reflected wave from a measurement object and an interference wave, a frequency of the reflected wave on a basis of each of the first spectrum data, the second spectrum data, and the third spectrum data.

7. The signal processing device according to claim 6, wherein
the processing circuitry is further configured:
to specify a peak that does not coincide with any peak included in the first spectrum data among one or more peaks included in the second spectrum data, and output frequency information indicating a frequency of the specified peak; and
to specify a frequency of the reflected wave from among frequencies of one or more peaks included in the third spectrum data on a basis of the output frequency information.

8. A radar device comprising:
a signal transmitter and receiver configured to generate a transmission wave whose frequency is modulated, shift a phase of the generated transmission wave in accordance with a phase shift control signal output during the first transmission process period, emit the transmission wave after the phase shift, then receive a reflected wave from the measurement object as a reception wave, generate a first beat signal having a difference frequency between the emitted transmission wave and the received reception wave, emit the generated transmission wave during the second transmission process period, then receive a reflected wave from the measurement object as a reception wave, and generate a second beat signal having a difference frequency between the emitted transmission wave and the received reception wave;
the signal processing device according to claim 4; and
a measurement object detector configured to calculate either one or both of a distance to the measurement object and a speed of the measurement object from the specified frequency of the reflected wave.

9. A radar device comprising:
a signal transmitter and receiver configured to generate a transmission wave whose frequency is modulated, shift a phase of the generated transmission wave in accordance with a phase shift control signal output during the first transmission process period, emit the transmission wave after the phase shift, then receive a reflected wave from the measurement object as a reception wave, generate a first beat signal having a difference frequency between the emitted transmission wave and the received reception wave, emit the generated transmission wave during the second transmission process period, then receive a reflected wave from the measurement object as a reception wave, and generate a second beat signal having a difference frequency between the emitted transmission wave and the received reception wave;
the signal processing device according to claim 5; and
a measurement object detector configured to calculate either one or both of a distance to the measurement object and a speed of the measurement object from the specified frequency of the reflected wave.

10. A radar device comprising:
a signal transmitter and receiver configured to generate a transmission wave whose frequency is modulated, shift a phase of the generated transmission wave in accordance with a phase shift control signal output during the first transmission process period, emit the transmission wave after the phase shift, then receive a reflected wave from the measurement object as a reception wave, generate a first beat signal having a difference frequency between the emitted transmission wave and the received reception wave, emit the generated transmission wave during the second transmission process period, then receive a reflected wave from the measurement object as a reception wave, and generate a second beat signal having a difference frequency between the emitted transmission wave and the received reception wave;

the signal processing device according to claim 6; and a measurement object detector configured to calculate either one or both of a distance to the measurement object and a speed of the measurement object from the specified frequency of the reflected wave.

11. A radar device comprising:

a signal transmitter and receiver configured to generate a transmission wave whose frequency is modulated, shift a phase of the generated transmission wave in accordance with a phase shift control signal output during the first transmission process period, emit the transmission wave after the phase shift, then receive a reflected wave from the measurement object as a reception wave, generate a first beat signal having a difference frequency between the emitted transmission wave and the received reception wave, emit the generated transmission wave during the second transmission process period, then receive a reflected wave from the measurement object as a reception wave, and generate a second beat signal having a difference frequency between the emitted transmission wave and the received reception wave;

the signal processing device according to claim 7; and a measurement object detector configured to calculate either one or both of a distance to the measurement object and a speed of the measurement object from the specified frequency of the reflected wave.

* * * * *